United States Patent
Ishibashi et al.

(10) Patent No.: US 11,399,102 B2
(45) Date of Patent: Jul. 26, 2022

(54) PRINT INFORMATION PROCESSING SYSTEM DETECTING CASSETTE BY ANALYZING IMAGE AND DETERMINING WHETHER DETECTED CASSETTE SATISFIES SPECIFIC CONDITION

(71) Applicant: BROTHER KOGYO KABUSHIKI KAISHA, Nagoya (JP)

(72) Inventors: Masayuki Ishibashi, Nagoya (JP); Chisato Yoshimura, Nagoya (JP); Takaaki Banno, Nagoya (JP); Motonori Tanaka, Nagoya (JP)

(73) Assignee: BROTHER KOGYO KABUSHIKI KAISHA, Nagoya (JP)

( * ) Notice: Subject to any disclaimer, the term of this patent is extended or adjusted under 35 U.S.C. 154(b) by 0 days.

(21) Appl. No.: 17/131,732

(22) Filed: Dec. 22, 2020

(65) Prior Publication Data

US 2021/0195034 A1   Jun. 24, 2021

(30) Foreign Application Priority Data

Dec. 24, 2019   (JP) .............................. JP2019-232719

(51) Int. Cl.
*H04N 1/00* (2006.01)
*G06F 3/12* (2006.01)
*G06V 20/00* (2022.01)

(52) U.S. Cl.
CPC ....... *H04N 1/00082* (2013.01); *G06F 3/1296* (2013.01); *G06V 20/00* (2022.01);
(Continued)

(58) Field of Classification Search
CPC .............. H04N 1/00082; G06F 3/1296; G06K 9/00624
See application file for complete search history.

(56) References Cited

U.S. PATENT DOCUMENTS

| | | | |
|---|---|---|---|
| 2008/0205958 A1 | 8/2008 | Moriyama et al. | |
| 2009/0073476 A1* | 3/2009 | Torikoshi | H04N 1/00472 358/1.18 |

(Continued)

FOREIGN PATENT DOCUMENTS

JP    2008-213462 A    9/2008

*Primary Examiner* — Benjamin O Dulaney
(74) *Attorney, Agent, or Firm* — Kenealy Vaidya LLP

(57) ABSTRACT

A print information processing system includes a terminal device, and a server. The terminal controller controls an image capturing device to capture an image representing at least part of a cassette and acquiring the captured image. The cassette accommodates print medium therein. A server storage stores information concerning a specific content including at least one of print data and information available for editing the print data. The system performs a detection process detecting the cassette by analyzing the captured image and a determination process determining whether the detected cassette satisfies a specific condition. The server controller performs an information transmission process transmitting the information concerning the specific content to the terminal device in a case where the determination process determines that the detected cassette satisfies the specific condition. The information transmission process is not performed in a case where the detected cassette does not satisfy the specific condition.

22 Claims, 8 Drawing Sheets

(52) U.S. Cl.
CPC ....... *H04N 1/00005* (2013.01); *H04N 1/0009* (2013.01); *H04N 1/00037* (2013.01); *H04N 1/00244* (2013.01)

(56) References Cited

U.S. PATENT DOCUMENTS

| | | | |
|---|---|---|---|
| 2009/0323086 A1* | 12/2009 | Brown | G06K 15/1856 |
| | | | 358/1.9 |
| 2017/0001821 A1* | 1/2017 | Sato | G06T 7/60 |
| 2017/0301161 A1* | 10/2017 | Sugishita | G07C 1/10 |
| 2018/0008104 A1* | 1/2018 | Becker | A47K 10/36 |

* cited by examiner

| ID | TYPE OF PRINT MEDIUM | LENGTH WHEN UNUSED | WIDTH | INITIAL ACCESS DATE | NUMBER OF ACCESSES | REMAINING AMOUNT OF TAPE |
|---|---|---|---|---|---|---|
| B001 | C1 | 8m | 18mm | 2019/1/1 | 1 | 7.52m |
| B521 | C2 | 8m | 24mm | 2019/1/31 | 4 | 0.30m |
| : | : | : | : | : | : | : |

FIG. 4

| ID | TYPE | CONTENT INFORMATION | CONTENT FILE |
|---|---|---|---|
| K001 | SPECIFIC | CONTENT A | F1 |
| K002 | SPECIFIC | CONTENT B | F2 |
| : | : | : | : |
| J001 | NORMAL | CONTENT a | f1 |
| J002 | NORMAL | CONTENT b | f2 |
| : | : | : | : |

PRINT INFORMATION PROCESSING SYSTEM DETECTING CASSETTE BY ANALYZING IMAGE AND DETERMINING WHETHER DETECTED CASSETTE SATISFIES SPECIFIC CONDITION

CROSS REFERENCE TO RELATED APPLICATION

This application claims priority from Japanese Patent Application No. 2019-232719 filed Dec. 24, 2019. The entire content of the priority application is incorporated herein by reference.

TECHNICAL FIELD

The present disclosure relates to a print information processing system including a server and a terminal device. The disclosure further relates to a method of processing print information, and also to a server particularly suitable when used in the system and the method.

BACKGROUND

A printing device known in the art detects a type of cassette accommodating elongated print medium wound around in a roll shape, and permits to use print data, and fonts and templates available for editing the print data depending upon the detected type of the cassette.

SUMMARY

Such a conventional printing device requires tasks to attach a cassette accommodating print medium in the body of the printing device in order to detect the type of the cassette.

In view of the foregoing, it is an object of the disclosure to provide a print information processing system, a print information processing method, and a server, to permit the use of the contents available for editing the print data without need for attaching a cassette to a body of a printing device in a case where the cassette satisfies a specific condition.

In order to attain the above and other objects, the disclosure provides a print information processing system. The print information processing system includes a terminal device, and a server. The terminal device includes an image capturing device, a terminal communication interface, a terminal controller, and a terminal storage. The terminal communication interface is communicable with both the server and a printer. The terminal controller is configured to control both the image capturing device and the terminal communication interface. The terminal storage stores terminal instructions that, when executed by the terminal controller, cause the terminal controller to perform controlling the image capturing device to capture an image representing at least part of a cassette and acquiring the captured image. The cassette accommodates print medium therein. The server includes a server communication interface, a server controller, and a server storage. The server communication interface is communicable with the terminal device. The server controller is configured to control the server communication interface. The server storage stores information concerning a specific content including at least one of print data and information available for editing the print data. The server storage further stores server instructions for controlling the server controller. The print information processing system is configured to perform: a detection process for detecting the cassette by analyzing the image captured by the image capturing device; and a determination process for determining whether the detected cassette satisfies a specific condition. The server instructions, when executed by the server controller, cause the server controller to perform an information transmission process for transmitting the information concerning the specific content stored in the server storage to the terminal device through the server communication interface in a first case where the determination process determines that the detected cassette satisfies the specific condition. The information transmission process is not performed in a second case where the determination process determines that the detected cassette does not satisfy the specific condition. The terminal instructions that, when executed by the terminal controller, cause the terminal controller to further perform receiving the information concerning the specific content transmitted from the server controller.

According to another aspect, the disclosure provides a method for processing print information. The method includes controlling an image capturing device to capture an image representing at least part of a cassette, the cassette accommodating print medium therein; detecting the cassette by analyzing the image captured by the image capturing device; and determining whether the detected cassette satisfies a specific condition; permitting use of a piece of specific information from among a plurality of pieces of information stored in a storage in a first case where the detected cassette satisfies the specific condition in the determining, the plurality of pieces of information concerning respective ones of contents, the piece of specific information concerning a specific content. The permitting is not executed in a second case where the detected cassette does not satisfy the specific condition.

According to still another aspect, the disclosure provides a server. The server includes a server communication interface, a server controller, and a server storage. The server communication interface is communicable with a terminal device. The server controller is configured to control the server communication interface. The server storage is configured to store information concerning a specific content including at least one of print data and information available for editing the print data. The server storage stores server instructions, when executed by the server controller, cause the server controller to perform: receiving an image from the terminal device; a detection process for detecting a cassette accommodating print medium therein by analyzing the received image; and transmitting the information concerning the specific content stored in the server storage to the terminal device through the server communication interface in a first case where the detected cassette satisfies a specific condition. The transmitting is not performed in a second case where the detected cassette does not satisfy the specific condition.

BRIEF DESCRIPTION OF THE DRAWINGS

The particular features and advantages of the disclosure as well as other objects will become apparent from the following description taken in connection with the accompanying drawings, in which:

FIG. 4 is an explanatory diagram for illustrating a content database stored in a storage of the content management server;

DETAILED DESCRIPTION

Hereinafter, one embodiment of the present disclosure will be described with reference to the accompanying drawings. In the following description, image data for displaying an image may be simply referred to as an image.

Figure 1:
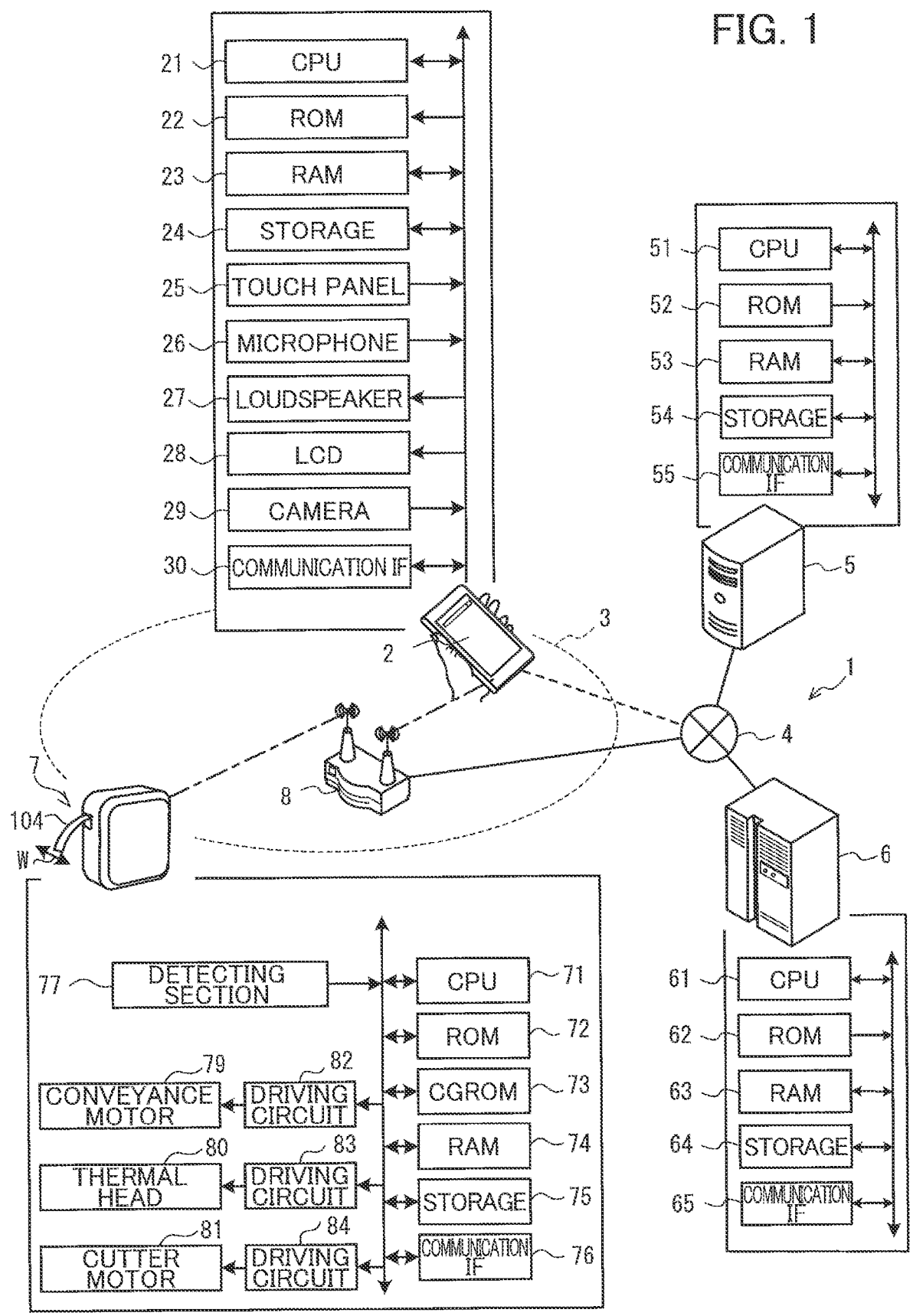
FIG. 1 is a block diagram showing an electrical configuration of a terminal device, a medium management server, and a content management server provided in a print information processing system.

As shown in FIG. 1, a print information processing system 1 includes a terminal device 2, a medium management server 5, and a content management server 6. The print information processing system 1 is configured to detect a tape cassette to be used in a printer 7 based on an image photographed by the terminal device 2. The printer 7 and the terminal device 2 resides on a LAN 3. The printer 7 is capable of communicating with the terminal device 2 via the LAN 3. In a case where the type of detected tape cassette satisfies specific conditions, the print information processing system 1 permits the terminal device 2 to use a piece of information concerning a specific content selected from a plurality of pieces of information concerning respective ones of contents stored in the content management server 6. Here, the plurality of pieces of information concerning contents is available for editing print data.

The terminal device 2 is a conventional smartphone for example and includes a CPU 21, a ROM 22, a RAM 23, a storage 24, a touch panel 25, a microphone 26, a loudspeaker 27, an LCD 28, a camera 29, and a communication interface 30. The CPU 21 controls processes of the terminal device 2 and is electrically connected to components of the terminal device 2 via an interface circuit (not shown). The ROM 22 stores programs such as a boot program. The RAM 23 stores a timer, a counter, flag data, and temporary data. The storage 24 includes storage medium such as a flash memory, and stores programs of processes executed by the CPU 21. The storage 24 stores OS, and various applications running on the OS. The touch panel 25 is configured to detect positions where touched. The microphone 26 converts ambient sound to sound data and outputs the sound data. The loudspeaker 27 outputs sound based on sound data inputted. The LCD 28 displays an image based on image data. The camera 29 captures an image falling on a filming range, and produces and outputs a captured image. The communication interface 30 includes a communication module to be connected to the LAN 3 and a public network 4 via an access point 8, and another communication module to be directly connected to the public network 4.

The medium management server 5 includes a CPU 51, a ROM 52, a RAM 53, a storage 54, and a communication interface 55. The CPU 51 is for controlling processes of the medium management server 5. The CPU 51 is electrically connected to the ROM 52, the RAM 53, the storage 54, and the communication interface 55 via an interface circuit (not shown). The ROM 52 stores programs such as a boot program. The RAM 53 stores a timer, a counter, flag data, and temporary data. The storage 54 has storage medium such as a flash memory, and stores programs for the processes executed by the CPU 51. The communication interface 65 is a communication module to be connected to the public network 4.

The content management server 6 includes a CPU 61, a ROM 62, a RAM 63, a storage 64, and a communication interface 65. The CPU 61 is for controlling processes of the content management server 6. The CPU 61 is electrically connected to the ROM 62, the RAM 63, the storage 64, and the communication interface 65 via an interface circuit (not shown). The ROM 62 stores programs such as a boot program. The RAM 63 stores a timer, a counter, flag data, and temporary data. The storage 64 has storage medium such as a flash memory, and stores programs for the processes executed by the CPU 61. The communication interface 65 is a communication module to be connected to the public network 4.

The printer 7 is a small-size label printer capable of printing characters (letters, symbols, numerals) on an adhesive tape 104 which is an elongated tape-like print medium with a release paper. The printer 7 performs printing based on print data transmitted from the terminal device 2. The printer 7 includes a CPU 71, a ROM 72, a CGROM 73, a RAM 74, a storage 75, and a communication interface 76. The ROM 72, the CGROM 73, the RAM 74, the storage 75, and the communication interface 76 are connected to the CPU 71.

The ROM 72 stores various programs required for controlling the printer 7. Based on such programs, the CPU 71 implements various arithmetic operations. The CGROM 73 stores sets of print dot pattern data representing various dot patterns so that the stored sets of print dot pattern data are classified in terms of format and size, and are correlated with respective ones of sets of code data. The RAM 74 has a plurality of storage areas such as text memory and print buffer. The text memory is configured to store data subject to printing. The print buffer is configured to store dot pattern data subject to printing. Other storage areas are configured to store various arithmetic operation data. The communication interface 76 is a communication module to be connected to the LAN 3 and the public network 4 via the access point 8.

The printer 7 further includes a detecting section 77, a conveyance motor 79, a thermal head 80, a cutter motor 81, and a driving circuits 82-84. The detecting section 77 and the driving circuits 82-84 are connected to the CPU 71. The detecting section 77 is a conventional sensor for detecting the type of the tape 104 mounted on the printer 7 and outputting the detected type of the tape 104 to the CPU 71. The driving circuit 82 is an electronic circuit for driving the conveyance motor 79 provided for conveying the tape 104 along a conveyance path. The driving circuit 83 is an electronic circuit for driving the thermal head 80. The driving circuit 84 is an electronic circuit for driving the cutter motor 81. The cutter motor 81 operates a moving blade (not shown) for cutting the printed tape segment of the print tape 104 discharged from the printer 7.

Figures 2, 3:
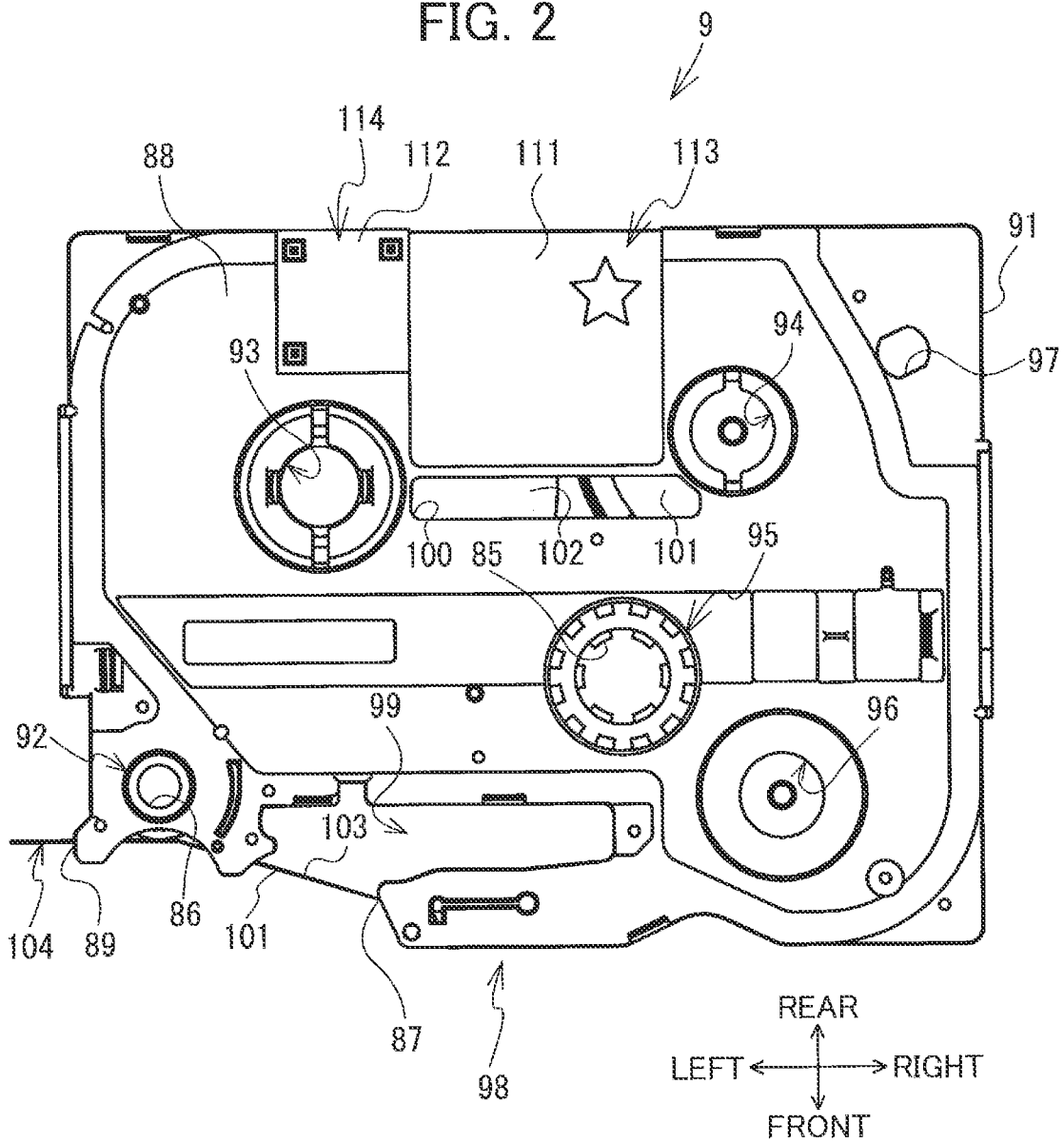
FIG. 2 is a plan view showing a tape cassette to be attached to and used for a printer.
FIG. 3 is an explanatory diagram for illustrating a table stored in a storage of the medium management server.

Referring to FIG. 2, description will be made with respect to a tape cassette 9 attachable to the printer 7. Hereinafter, the tape cassette is simply referred to as the cassette. The cassette 9 includes a cassette case 91 that accommodates an elongated tape-like print medium therein. The cassette 9 accommodates one type of print medium from among a plurality of print mediums. The types of print mediums include a laminate type and a receptor type, for example. For the laminate type print medium, printing is performed on a transparent film tape 101 made of resin, and thereafter a double-sided adhesive film tape 102 is adhered on the printed surface of the transparent film tape 101 in the printer 7. In a case where the laminated type print medium is used for the cassette 9, the cassette case 91 accommodates the film tape 101, the double-sided adhesive tape 102, and an ink ribbon 103. For the receptor type print medium, printing is performed on a single-sided adhesive tape. Specifically, the single-sided adhesive tape has a base film made of resin. An adhesive layer is formed on only one surface of the base film and printing is performed on the other surface of the base film. In a case where the receptor type print medium is used for the cassette 9, the cassette case 91 accommodates the single-sided adhesive tape and an ink ribbon 103 therein. The types of print mediums are also classified in terms of width W of the print medium, color of the print medium, color of the ink ribbon 103, and material of the print medium. A structure of the cassette 9 will be described in a case where the laminated print medium as an example is used.

As shown in FIG. 2, the cassette case 9 has substantially a rectangular parallelepiped housing (a box shaped housing) having rounded corners in planar view. The cassette case 91 includes support sections 92-96, an aperture 97, an arm 98, a head insertion section 99, a tape discharge port 89, and a window 100. Each of the support sections 92-96 is a cylindrical shape with a circular shape in planar view. The support section 92 is provided in the left front corner portion (left lower corner portion as viewed in FIG. 2) of the cassette case 91 for rotatably supporting the tape drive roller 86. The tape drive roller 86 conveys the film tape 101 as a print medium and the double-sided adhesive tape 102. The support section 93 is provided in the left rear corner portion (left upper corner portion as viewed in FIG. 2) of the cassette case 91 for rotatably supporting a spool around which the double-sided adhesive tape 102 is wound. The double-sided adhesive tape 102 has an elongated tape having one surface to which a release paper is attached.

The support section 94 is provided in the right rear corner portion (right upper corner portion as viewed in FIG. 2) of the cassette case 91 for rotatably supporting a spool around which the film tape 101 is wound. The film tape 101 is a transparent elongated tape and printing is performed on one surface thereof. The thermal head 80 prints an image on the film tape 101 using the ink ribbon 103 overlapped on the film tape 101. The double-sided adhesive tape 102 is to be adhered to the printed surface of the film tape 101. The support section 96 is located in a right front portion of the cassette case 91 for rotatably supporting a spool around which the ink ribbon 103 is wound. The support section 95 is located on left front side of the support section 94 and left rear side of the support section 96. The support section 95 is provided for winding up the ink ribbon 103 drawn from the spool supported by the support section 96. The aperture 97 is formed on the right rear side of the support section 94 and penetrates through the cassette case 91 in its thickness direction (the vertical direction). The aperture 97 has an elliptical shape in planar view. The arm 98 extends to a leftward direction from a right front portion of the cassette case 91. On the left rear side of the arm 98, the cassette case 91 has an opening 87 penetrating in the vertical direction. The thermal head 80 is inserted into the head insertion section 99. The tape discharge port 89 is an opening elongated in the vertical direction and formed in the front portion of the left sidewall of the cassette case 91. The window 100 is an opening formed on the right side of the support section 93 and elongated in the left-right direction on the upper surface 88 of the cassette case 91. Through the window 100, a user can recognize the remaining amount (length) of the film tape 101 and the double-sided adhesive tape 102 both accommodated in the cassette case 91.

The cassette 9 includes mark labels 111, 112 affixed to the rear end portion of the upper surface 88 of the cassette case 91. More specifically, the mark label 111 is positioned at the central portion in the left-right direction in the rear end portion of the upper surface 88. A logo 113 is printed on the mark label 111. The logo 113 includes at least one of a symbol, emblem, logotype (word or letter(s)) of the cassette 9. The logo 113 indicates the type of the print medium (the tape width W, color, material, and a model) provided in the cassette 9, for example. Instead of or in addition to the logo label 113 printed on the mark label 111, the mark label 111 may represent a character string (texts) including at least one of the product name of the cassette 9, the product number of the cassette 9, and type of the print medium. Or, the mark label 111 may represent an image of figure and/or illustration. The mark label 112 is affixed to the rear end portion on the upper surface 88 of the cassette case 91 and located on the left side of the mark label 111. A matrix type two-dimensional code 114 is printed on the mark label 112. The two-dimensional code 114 indicates an identification number (identification information) of the cassette 9 for identifying the cassette. A manufacturing number of the cassette 9 may be used as the identification number of the cassette 9, for example. The matrix type two-dimensional code 114 may be a QR code.

When the cassette 9 is attached to the printer 7 and a print operation is instructed, the CPU 71 drives the conveyance motor 79, the thermal head 80, and the cutter motor 81 based on print data, thereby performing printing. More specifically, the tape drive roller 86 is rotated by a drive shaft (not shown) of the conveyance motor 79. The film tape 101 and the double-sided adhesive tape 102 are drawn by the tape drive roller 86 in cooperation with a conveyance roller (not shown). In synchronization with the driving of the tape drive roller 86, a ribbon take-up shaft (not shown) is rotated to thereby draw the ink ribbon 103.

Conveyance of the film tape 101 and the ink ribbon 103 are guided together inside the arm portion 98. The film tape 101 and the ink ribbon 103 are superimposed at the opening 87 formed at the tip end of the arm portion 98, and thereafter discharged outside the arm portion 98. The thermal head 80 prints on the film tape 101 having discharged outside the opening 87 using the ink ribbon 103 superimposed on the film tape 101. The ink ribbon 103 having used for printing is would around the spool supported by the support section 95. The film tape 101 to which printing has been performed is conveyed in a direction toward the tape drive roller 86. The double-sided adhesive tape 102 is guided to a position between the drive roller 86 and a movable conveyance roller, and the double-sided adhesive tape 102 is superimposed on the printed surface of the film tape 101 so that the double-sided adhesive tape 102 is adhered to the film tape 101. The printed tape 104, which is the film tape 101 on which printing is performed and to which the double-sided adhesive ape 102 is adhered, is conveyed toward the tape discharge port 89 and cut by a cutter mechanism (not shown) of the printer 7.

Referring to FIG. 3, description will be made with respect to a table 59 stored in the storage 54 of the medium management server 5. The table (or database) 59 stored in the storage 54 is for providing a relationship between identification information (ID) of the cassette 9 and management information for managing the cassette 9. The identification information of the cassette 9 is for identifying the cassette 9. The identification information of the cassette 9 may be a manufacturing number, for example. The identification information of the cassette 9 may be a character string represented by a combination of alphabetical characters and numerals, for example. The management information according to the embodiment includes a print medium type, a longitudinal length of the print medium at the time when the print medium remains unused, and a tape width W that is a widthwise length of the print medium orthogonal to the longitudinal direction of the print medium. The management information according to the embodiment further includes use history of the print medium. The use history includes an initial access date, number of accesses, and a remaining amount (length) of the tape. The initial access date designates a date at which a detection process is firstly executed for the mounted cassette identified by the identification information. The initial access date is represented by a western calendar date in the form of YYYY/MM/DD, for example. The number of accesses designates number of times of execution of the cassette detection process for the cassette identified by at least the identification information. Here, the cassette detection process is executed by using a captured image of the cassette. The remaining amount of the tape indicates a remaining length of the print medium accommodated in the cassette identified by the identification information.

Referring to FIG. 4, description will be made with respect to the content database stored in the storage 64 of the content management server 6. The content database 69 stores information concerning content which includes at least one of print data and information available for editing the print data. The content includes at least one of a template, a font, and an external character, which can be used for editing the print data. Here, the template is for defining an image and may include a background image, information on layout of objects in an image, and a format of objects such as texts. The external character is a character not registered in the printer 7 and/or the terminal device 2. The content may be print data. Further, the information concerning content may be the content itself, or/and may be information related to content such as information of attribute of content, information of a title of the content, information of an explanation of the content, information of a use example of the content, or/and information of a thumbnail image. The content database 69 according to the embodiment includes an ID, a type, content information (name or title of content), and a content file. The ID is identification information for identifying the content. The ID is represented by a character string having a combination of alphabetical characters and numerals, for example. The type indicates a type or kind of the information concerning the content. In this embodiment, the type includes selective one of a specific type and a normal type. The specific type indicates a content that the terminal device 2 is permitted to use in a case where the type of cassette is specified based on an image transmitted from the terminal device 2. The normal type indicates a content that the terminal device 2 is permitted to use regardless of whether the type of cassette is specified or not based on an image transmitted from the terminal device 2. Alternatively, the specific type may indicate a content that the terminal device 2 is permitted to use in a case where the type of cassette is specified based on an image transmitted from the terminal device 2 and the specified type of cassette is one of predetermined specific types that includes new type cassette 9 for example. In this case, the normal type indicates a content that the terminal device 2 is permitted to use regardless of detection or non-detection of the type and the detected type of cassette.

Figure 8:
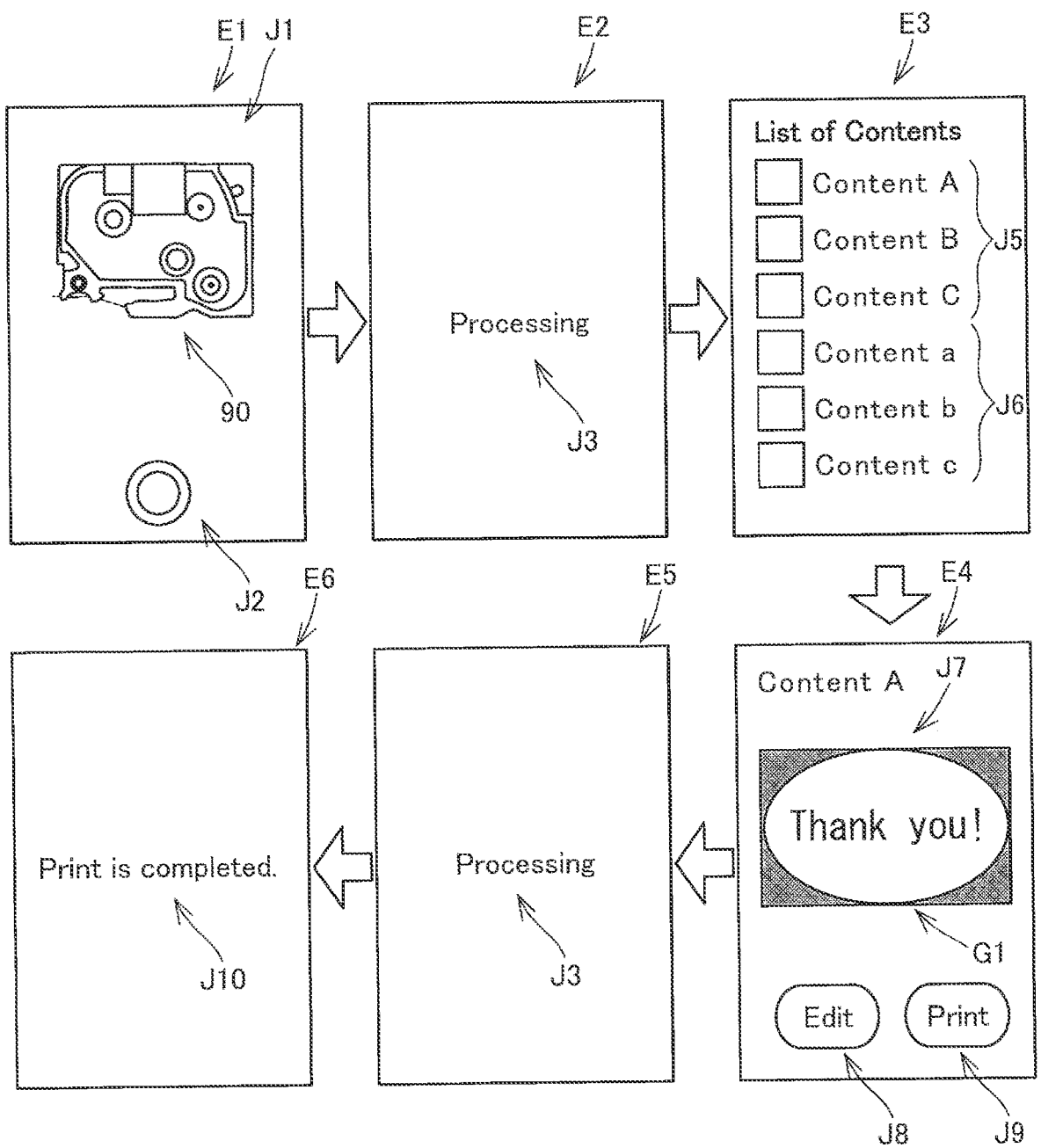
FIG. 8 is an explanatory diagram illustrating transition of a screen displayed on an LCD of the terminal device for Example 1.
Figure 9:
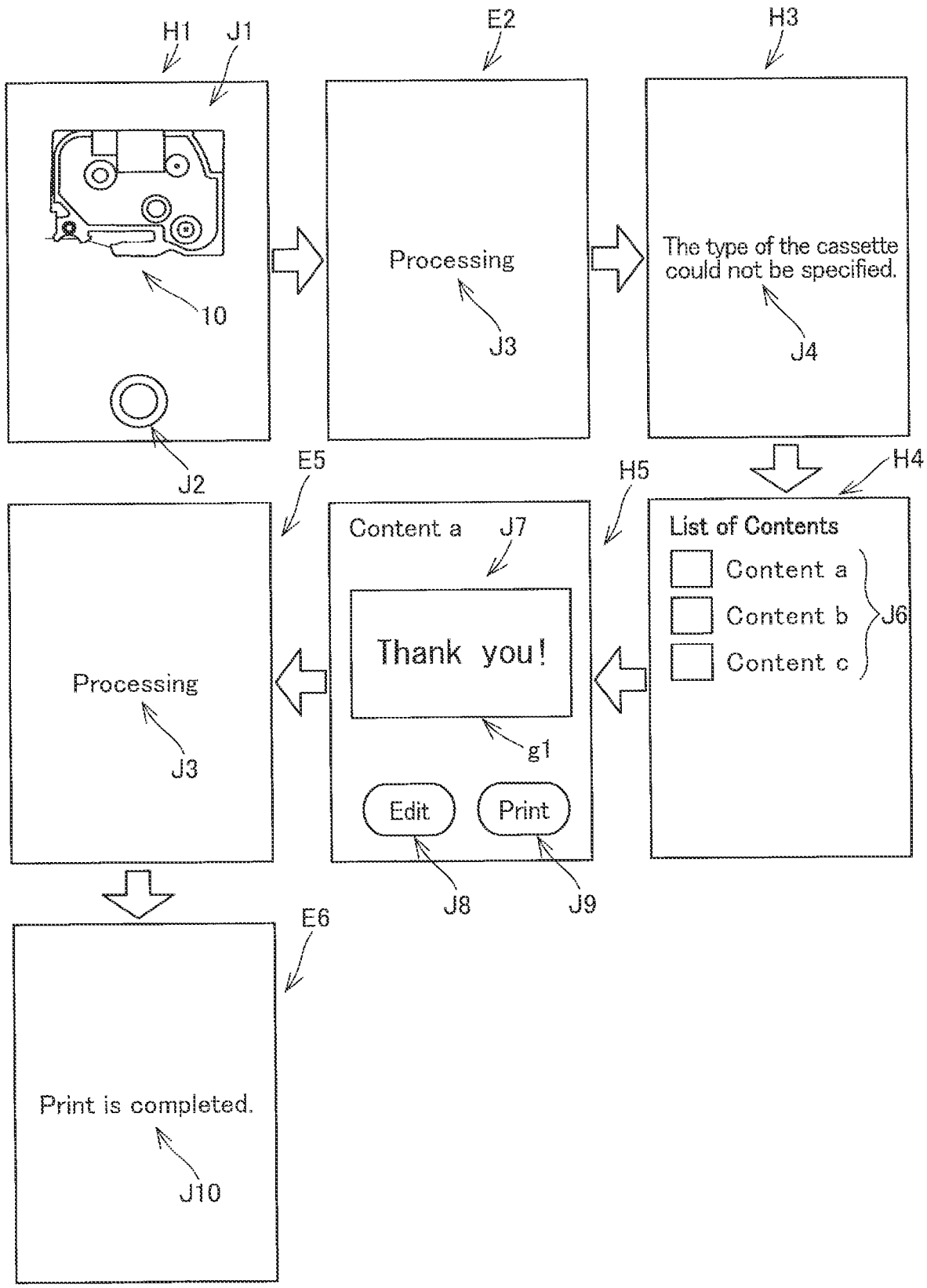
FIG. 9 is an explanatory diagram illustrating transition of a screen displayed on an LCD of the terminal device for Example 2.

Referring to FIGS. 5-9, processes executed by the print information processing system 1 and the printer 7 will be described. FIGS. 8 and 9 respectively show Examples 1 and 2 according to these processes. The processes of the terminal device 2 are executed by the CPU 21 when one or more programs read from the ROM 22 and/or the storage 24 are stored in the RAM 23 by the CPU 21. The processes of the medium management server 5 are executed by the CPU 51 when one or more programs read from the ROM 52 and/or the storage 54 are stored in in the RAM 53 by the CPU 51. The processes of the content management server 6 are executed by the CPU 61 when one or more programs read from the ROM 62 and/or the storage 64 are stored in in the RAM 63 by the CPU 61. The processes of the printer 7 are executed by the CPU 71 when one or more programs read from the ROM 72 are stored in the RAM 74 by the CPU 71. In the following description, step will be abbreviated to "S". Example 1 is an example in a case where the camera 29 of the terminal device 2 captures an image of the new type cassette 9 from the upper side thereof. Example 2 is an example in a case where the camera 29 captures an image of an old type cassette 10 from the upper side thereof. The old type cassette 10 is different from the cassette 9. The old type cassette 10 has an outer profile (an outline) the same as that of the new type cassette 9. However, the old type cassette 10 is not formed with the aperture 97 that is formed in the cassette 9. The processes in Examples 1 and 2 are carried out at different times. However, in the following description, these two processes will be described in parallel for simplicity.

Figure 5:
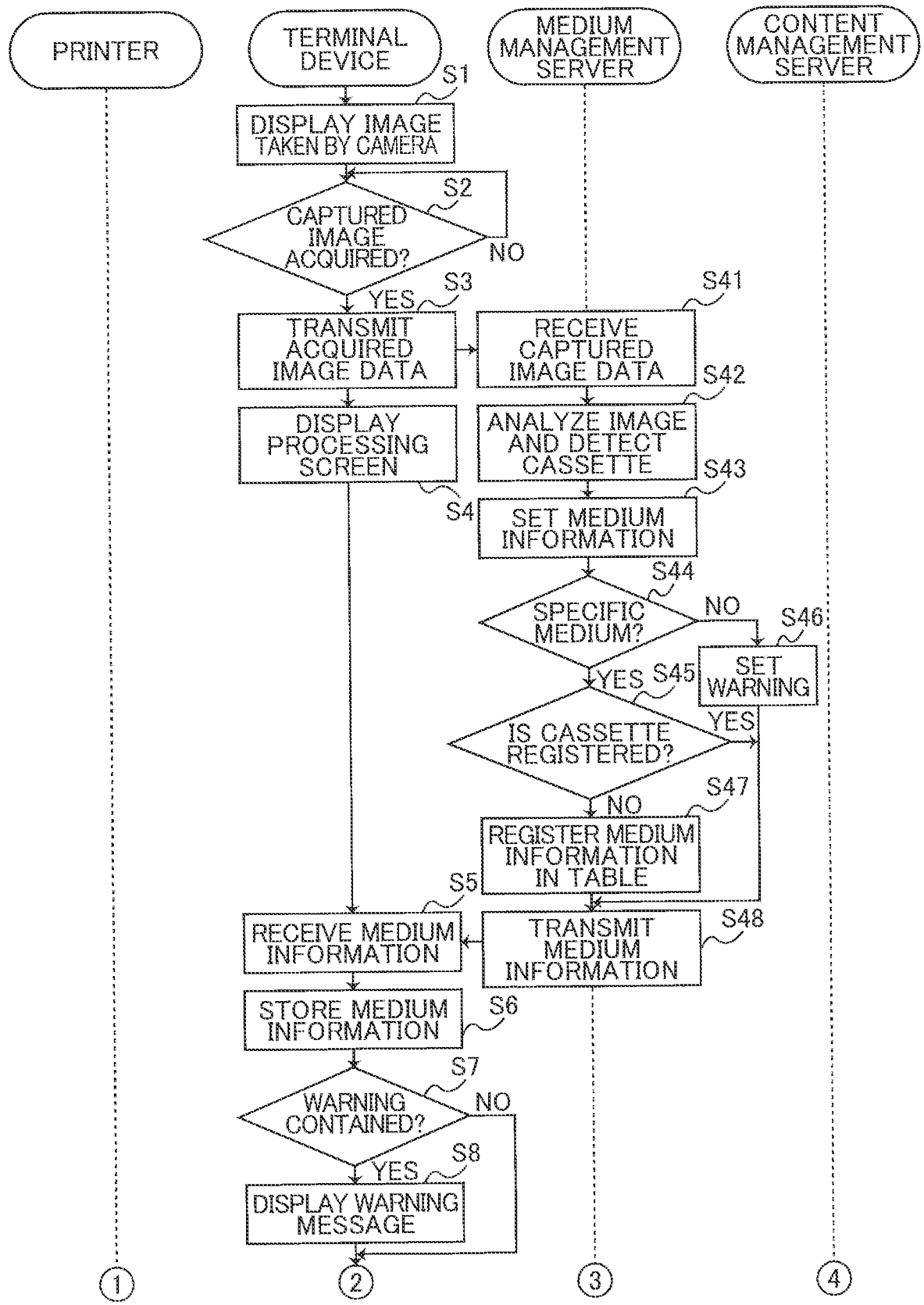
FIG. 5 is a first part of a flowchart illustrating processes executed in the print information processing system and the printer.
Figure 6:
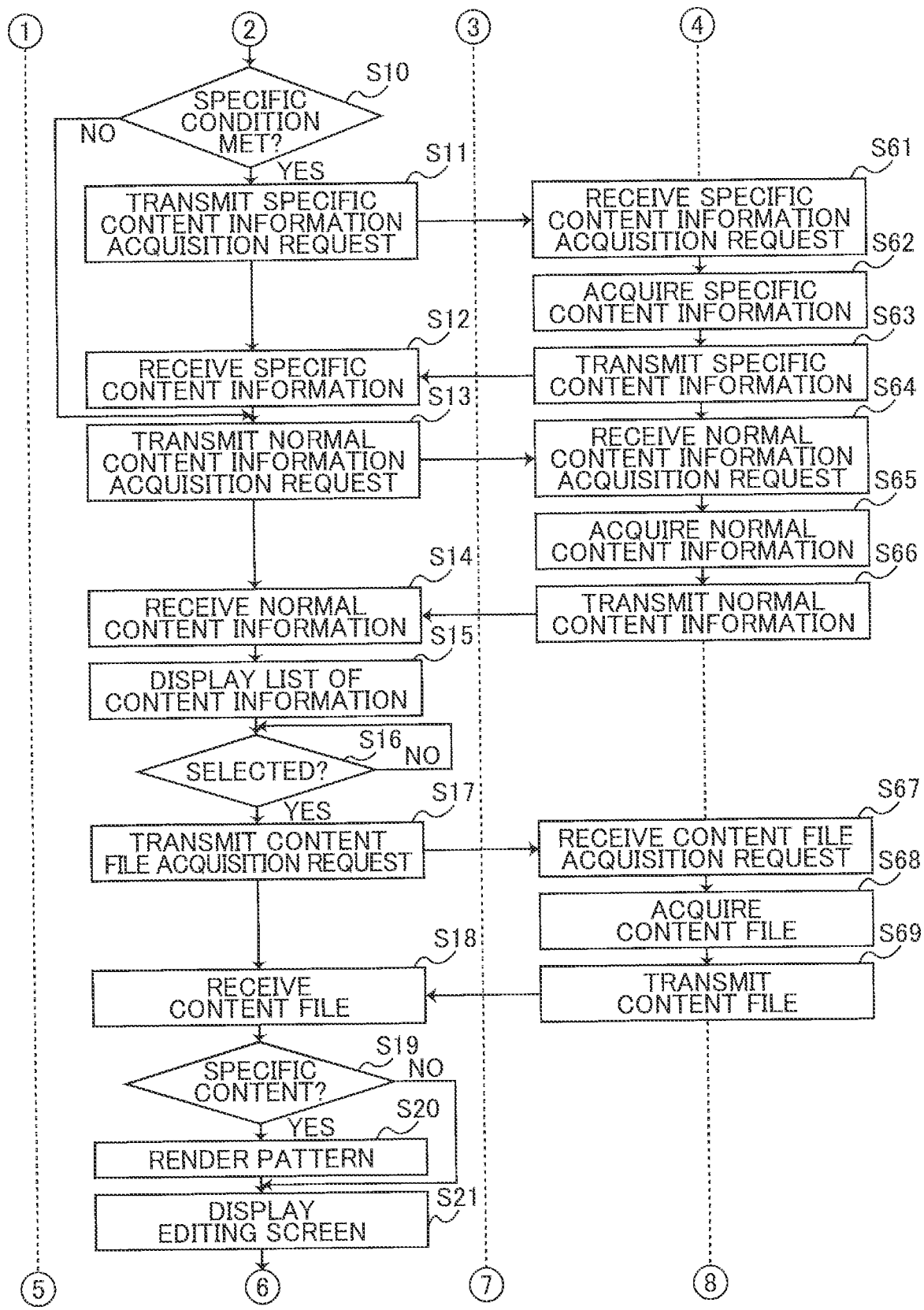
FIG. 6 is a second part of the flowchart illustrating processes executed in the print information processing system and the printer.
Figure 7:
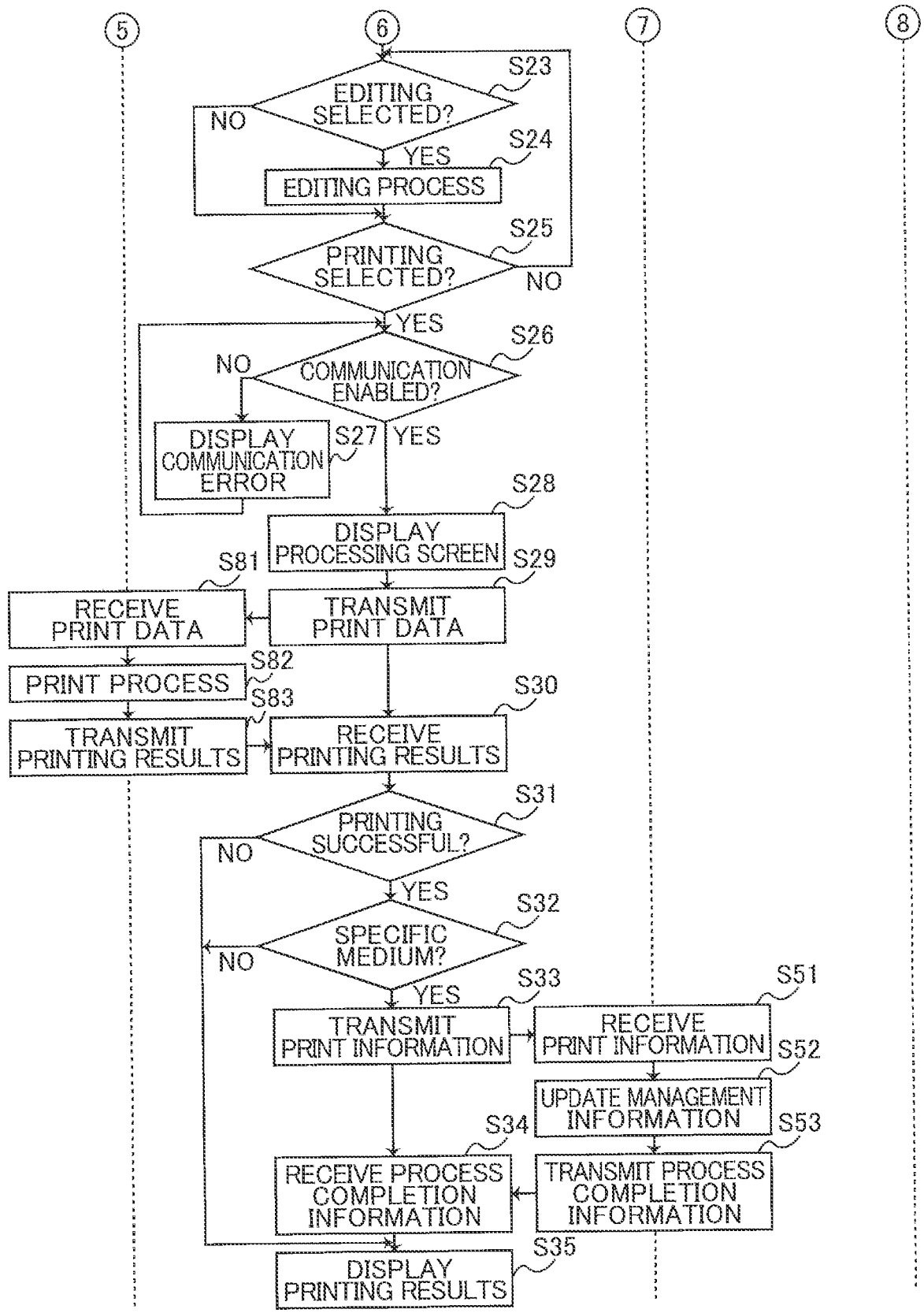
FIG. 7 is a final part of the flowchart illustrating processes executed in the print information processing system and the printer.

As shown in FIG. 5, in S1 the CPU 21 of the terminal device 2 displays an image (video image) currently taken by the camera 29 on the LCD 28. In Example 1, the CPU 21 displays a screen E1 on the LCD 28 as shown in FIG. 8. In Example 2, the CPU 21 displays a screen H1 on the LCD 28 as shown in FIG. 9. Both the screens E1 and H1 have a display area J1 and an input key J2. The display area J1 displays an image (video image) currently taken by the camera 29. The input key J2 is a shutter button selected when instructing to capture an image (still image). Hereinafter, the still image captured is referred to as the capture image. After a user checks an image representing an entire cassette from the upper side thereof on the display area J1, the user selects the input key J2 to capture the image (still image). In S2 the CPU 21 determines whether the image (captured image) is acquired. The CPU 21 repeatedly implements the determination in S2 until an image is acquired (S2: NO). After the image of the cassette is captured by the terminal device 2, the user attaches the cassette to the printer 7. This attachment of the cassette may be performed in arbitrary time after the image is captured and before the process of S25 (described later) is performed.

When a selection of the input key J2 is detected, the CPU 21 acquires the captured image represented by image data outputted from the camera 29 (S2: YES). In Example 1, the CPU 21 acquires image data representing a captured image representing the entire cassette 9 viewed from the upper side thereof. In Example 2, the CPU 21 acquires image data representing a captured image representing the entire cassette 10 viewed from the upper side thereof. In S3 the CPU 21 transmits the acquired image data to the medium management server 5, and in S4 displays the image screen E2 on the LCD 28 as shown in FIGS. 8 and 9. The image screen E2 displays a message J3 stating "processing" to notify the user that the process is in progress. In S41 the CPU 51 of the medium management server 5 receives the image data transmitted from the terminal device 2 in S3.

In S42 the CPU 51 analyzes the image received in S41 and detects a cassette from the received image. Specifically, the CPU 51 analyzes the captured image and detects the cassette 9 based on profile lines of figures contained in the image. A conventionally known technique can be used for detecting the cassette 9 from the image. For example, the CPU 51 binarizes the image, extracts a group of profile lines representing the figures from the binarized image, and detects the shape of the cassette. Here, each profile line of the figure in the binarized image indicates a border line of the figure in the image. That is, the profile line is a line defined by pixels having a strong edge strength. The storage 54 stores a group of reference profile lines representing the cassette 9. The group of reference profile lines stored in the storage 54 includes an outer profile line representing an outline of the cassette 9 and profile lines inside the outer profile line representing structures in the outline of the cassette 9. The CPU 51 compares the group of reference profile lines representing the cassette 9 stored in the storage 54 with the extracted group of profile lines. In a case where the similarity of the two groups of profile lines is within a predetermined range based on this comparison, the CPU 51 identifies the type of the cassette detected from the image as the new type cassette 9. In the embodiment, the CPU 51 may distinguish the new type cassette 9 from the old type cassette 10 by determining whether a profile line representing the aperture 97 exists within a prescribed range from the outer profile line representing an outline of the cassette based on the extracted group of profile lines.

The CPU 51 may detect the logo 113 included in the mark label 111 in the image. A conventionally known technique for detecting the logo 113 may be employed. In this case, in S42 the CPU 51 identifies the type of the cassette from the captured image based on the detected logo 113. The CPU 51 detects the type of the cassette (print medium) based on a correlation between the logo and type of the cassette (print medium) stored in the storage 54, and based further on comparison between this correlation and the logo 113 extracted from the image.

Further in S42 the CPU 51 detects the two-dimensional code 114 included within the mark label 112. A conventionally known technique for detecting the two-dimensional code may be employed. The CPU 51 acquires identification information of the cassette based on the detected two-dimensional code 113. The CPU 51 detects a character string specified by the two-dimensional code 114 as identification information of the cassette for identifying the cassette.

In S43 the CPU 51 sets medium information based on the detection results in S42. The medium information includes pieces of information such as, identification information of the cassette specified in S42, information as to whether the cassette detected in S42 is a specific medium (or specific cassette), and management information of the cassette specified in S42. The case where the cassette specified in S42 is a specific medium indicates a case where the group of profile lines of the figures extracted from the image matches the group of reference profile lines stored in the storage 54 and thus the detected cassette is the type of the cassette 9 that can be used to the printer 7, for example. The specific medium may be determined in a case where the type of the cassette detected is one of the prescribed specific types by using the detection results of the mark labels 111, 112, for example. The medium information may not be set if at least one piece of information described above is not specified in S42. Alternatively, the medium information may be set for one or more pieces of information that can be specified in S42.

In S44 the CPU 51 determines whether the cassette detected in S42 is the specific medium (the specific cassette) based on the medium information set in S43. In Example 1, the cassette detected in S42 is determined to be the specific medium (S44: YES), and in S45 the CPU 51 determines whether the cassette 9 specified in S42 is registered in the storage 54 (the table 59) based on the medium information (the identification information) set in S43. In a case where the identification information of the detected cassette 9 is not registered in the storage 54 (S45: NO), in S47 the CPU 51 registers the medium information set in S43 in the table 59 of the storage 54 and proceeds to the process of S48 described later. In Example 2, the cassette specified in S42 is not determined to be the specific medium (S44: NO), and in S46 the CPU 51 adds a warning to the medium information set in S43. The warning is a message stating "The type of the cassette could not be specified", for example. The warning with respect to Example 2 may be a message stating "Old type cassette is specified. Please note that use of this cassette is not recommended for the printer.", for example. In S48 the CPU 51 transmits the medium information to the terminal device 2 after the process of S46 or S47 is executed. In Example 1, in a case where the identification information of the cassette 9 specified in S42 is B001, the cassette 9 (specifically, the identification information "B001") is determined to be stored in the storage 54 (S45: YES), then the CPU 51 increments the number of accesses corresponding to identification information B001 by 1 (one), and in S48 the CPU 51 transmits the medium information set in S43 to the terminal device 2 from which the image is received in S41. Accordingly, the number of accesses indicates the number of transmission of the captured image representing the cassette 9 from the terminal device 2 to the medium management server 5.

In S5 the CPU 21 of the terminal device 2 receives the medium information transmitted from the medium management server 5, and in S6 stores the medium information in the storage 24. In S7 the CPU 21 determines whether a warning is contained in the medium information. In Example 2, the warning is contained in the medium information (S7: YES), in S8 the CPU 21 controls the LCD 28 to display the message of the warning in the LCD 28. For example, the CPU 21 displays on the LCD 28 a warning message J4 stating "The type of the cassette could not be specified" as shown in a screen H3 of FIG. 9. After NO determination is made in S7 or the process of S8 is executed, the CPU 21 executes the process in S10. Specifically, in Example 1, the warning is not contained in the medium information (S7: NO), in S10 the CPU 21 determines whether the cassette detected in S42 satisfies the specific condition. In the embodiment, the specific condition includes a plurality of condition. The specific condition is determined to be met when all the conditions included in the specific condition are met. The specific condition includes a condition regarding the shape of the cassette specified in S42. That is, the specific condition includes a condition that the shape (the group of profile lines) of the cassette specified in S42 is the same as or similar to the reference shape (the group of reference profile line) of the cassette 9 stored in the storage 54, for example. In a case where the similarity between the shape (the group of profile lines) of the cassette specified in S42 and the reference shape (the group of reference profile lines) of the cassette 9 stored in the storage 54 falls within the predetermined range, the cassette specified in S42 is determined to be the same as or similar to the cassette 9 stored in the storage 54. The CPU 21 determines whether the shape of the cassette specified in S42 is the same as or similar to the shape of the cassette 9 based on whether the warning is set (included) in the medium information. The specific condition according to the present embodiment further includes a condition that a use history correlated with the identification information of the detected cassette (the use history in the medium information received in S5) satisfies a prescribed condition. The prescribed condition includes a plurality of conditions. The prescribed condition includes a condition that the current determination process in S10 is executed at timing within a predetermined number of days from the initial access date included in the use history of the received medium information. The prescribed condition further includes a condition that the number of accesses included in the use history of the received medium information is smaller than a predetermined number of times. The prescribed condition further includes a condition that the remaining amount (length) of the tape included in the use history of the received medium information is larger (longer) than a predetermined amount (length). The predetermined number of days, the predetermined number of times, and the predetermined amount (length) may be appropriately determined depending on the type of the print medium accommodated in the cassette, an initial length of the print medium, and the like.

In the embodiment, the predetermined number of days is half a year, the predetermined number of times is thirty (30) times, and the predetermined length is 0.2 m, for example. In Example 1, the CPU 21 determines that the cassette detected in S42 satisfies all the conditions included in the specific condition (S10: YES), and in S11 transmits a specific content information acquisition request to the content management server 6. The specific content information acquisition request is a request for instructing the content management server 6 to transmit to the terminal device 2 one or more pieces of specific content information selected from the pieces of content information (name or title of content) stored in the content management server 6. Here, the piece of specific content information is content information correlated with the specific type in the content database 69. The specific content information acquisition request may designate a type of the cassette (print medium) to be used for printing. In S61 the CPU 61 of the content management server 6 receives the specific content information acquisition request, and in S62 acquires one or more pieces of specific content information from the database 69. In a case where the content database 69 stores pieces information concerning the contents while classifying the pieces of information concerning the contents in terms of the type of the cassette (print medium), in S62 the CPU 61 may acquire from the content database 69 one or more pieces of specific content information corresponding to a type of the cassette (print medium) designated by the specific content information acquisition request. In S63 the CPU 61 transmits one or more pieces of specific content information acquired in S62 to the terminal device 2 from which the specific content information acquisition request is received in S61. In S12 the CPU 21 of the terminal device 2 receives one or more pieces of specific content information transmitted from the content management server 6, and executes the process in S13. In Example 2, the medium information includes the warning and the shape of the cassette specified in S42 does not satisfy the condition regarding the shape of the cassette 9 stored in the storage 54 (S10: NO), the CPU 21 of the terminal device 2 skips the processes of S11 and S12. After NO determination is made in S10 or the process of S12 is executed, in S13 the CPU 21 transmits a normal content information acquisition request to the content management server 6. The normal content information acquisition request is for requesting the content management server 6 to transmit to the terminal device 2 one or more pieces of normal content information selected from the pieces of content information (name or title of content) stored in the content management server 6. Here, the piece of normal content information is content information correlated with the normal type in the content database 69. The normal content information acquisition request may designate a type of the cassette (print medium) to be used for printing.

In S64 the CPU 61 of the content management server 6 receives the normal content information acquisition request transmitted from the terminal device 2, and in S65 acquires one or pieces of normal content information from the content database 69. In the case where the content database 69 stores information concerning the content while classifying the pieces of information concerning the content in terms of the type of the cassette (print medium), in S65 the CPU 61 may acquire from the content database 69 one or more pieces of normal content information corresponding to a type of the cassette (print medium) designated by the normal content information acquisition request similarly to the process of S62. In S66 the CPU 61 transmits one or more pieces of normal content information acquired in S65 to the terminal device 2 from which the normal content information acquisition request is received in S64. In S14 the CPU 21 of the terminal device 2 receives one or more pieces of normal content information transmitted from the content management server 6, and in S15 displays a list of pieces of content information on the LCD 28. In Example 1, as shown in the screen E3 depicted in FIG. 8, the CPU 21 displays the list of pieces of content information including the pieces of specific content information J5 received in S12 and the pieces of normal content information J6 received in S14. The pieces of specific content information J5 includes contents A-C, and the pieces normal content information J6 contents a-c. In Example 2, as shown in the screen H4 of FIG. 9, the CPU 21 of the terminal device 2 displays a list of pieces of content information including only the pieces of normal content information J6.

In S16 the CPU 21 determines whether selection for one of the pieces of content information (contents) displayed on the LCD 28 is detected. The user selects a desired piece of content information (contents) while watching the LCD 28. The CPU 21 repeatedly executes the determination in S16 until selection of one piece of content information (contents) is detected (S16: NO). In Example 1, when the selection of the content A is detected, in S17 the CPU 21 transmits to the content management server 6 a content file acquisition request for requesting to acquire a content file of the selected content A. In Example 2, when selection of the content a is detected (S16: YES), in S17 the CPU 21 transmits to the content management server 6 a content file acquisition request for requesting to acquire a content file of the selected content a.

In S67 the CPU 61 of the content management server 6 receives the content file acquisition request, and in S68 acquires from the content database 69 a content file designated by the content file acquisition request. In S69 the CPU 61 transmits the content file acquired in S68 to the terminal device 2 from which the content file acquisition request is received in S67. In S18 the CPU 21 of the terminal device 2 receives the content file transmitted from the content management server 6, and in S19 determines whether the content file received in S18 is a specific content file (specific content) corresponding to the piece of specific content information. The CPU 21 may execute the process of S19 based on the content of the piece of content information selected in S16 and/or based on the content file received in S18.

In the present embodiment, the specific content includes image data representing a pattern decorating background, for example. On the other hand, the normal content different from the specific content does not include the image data representing the pattern. Ina case where the content file received in S18 is the specific content (S19: YES), in S20 the CPU 21 executes a process for preparing to display the pattern on the LCD 28 (for example, a process for rendering the pattern) based on the image data contained in the content file. Ina case where the content file received in S18 is not the specific content (S19: NO) or a case where the process of S20 is executed, in S21 the CPU 21 displays an editing screen on the LCD 28 for editing image data representing the content file received in S18. Editing the print data refers to a concept including newly producing image data, a layout change of the print object, and change of the display content on the LCD 28 resulting from the change of the image data.

In Example 1, the CPU 21 displays the screen E4 as shown in FIG. 8. The screen E4 has a display field J7 and the input keys J8, J9. The display field J7 displays an image represented by the content file received in S18. In Example 1 the display field J7 displays an image G1 represented by the content file F1 corresponding to the content A. The image G1 is a combination of alphanumerals and the pattern that is rendered in the process of S20. The input key 18 is selected for entering an instruction to edit the content file displayed in the display field J7. Editing the content file includes adding to the displayed image object such as character and/or figure, rotating the object in the displayed image, and scaling the object in the displayed image, for example. The input key J9 is selected for entering an instruction to generate the print data based on the content file displayed on the display field J7 and to transmit the generated print data to the printer 7. In Example 2, the CPU 21 displays the screen H5 on the LCD 28 as shown in FIG. 9. The screen H5 has a display field J7 and the input keys J8, J9. In Example 2 the display field J7 displays an image g1 represented by the content file f1 corresponding to the content "a". The image g1 includes alphanumerals but does not include the pattern.

In S23 (FIG. 7) the CPU 21 determines whether selection of the input key J8 is detected. In a case where selection of the input key J8 is detected (S23: YES), in S24 the CPU 21 executes an editing process. The CPU 21 displays an editing menu of a command for adding an object such as characters and/or figures to the displayed image, a command for rotating the object, and a command for scaling the object, for example. The CPU 21 executes a process according to the selected command in the editing menu. In a case where selection of the input key J8 is not detected (S23: NO) or in a case where the process of S24 is ended, in S25 the CPU 23 determines whether selection of the input key J9 is detected. In a case where selection of the input key J9 is not detected (S23: NO), the process is returned to S23. In a case where the user finishes editing the content file and then wishes to instruct the printing based on the content file displayed in the display field J7, the user selects the input key J9. In a case where selection of the input key J9 is detected (S25: YES), in S26 the CPU 21 determines whether the terminal device 2 (or the CPU 21) can communication with the printer 7.

In a case where the CPU 21 transmits a predetermined communication start signal to the printer 7 and receives a reply to the communication start signal, the CPU 21 determines that the terminal device 2 (the CPU 21) can communicate with the printer 7. In a case where the terminal device 2 (the CPU 21) cannot communicate with the printer 7 (S26: NO), in S27 the CPU 21 displays a communication error on the LCD 28 for prompting the user to implement manipulations needed for enabling the communication between the printer 7 and the terminal device 2, and returns to S26. In a case where the terminal device 2 (the CPU 21) can communicate with the printer 7 (S26: YES), in S28 the CPU 21 displays a processing screen having a message J3 ("Processing") on the LCD 28 as shown in the screen E5 of FIG. 8 or FIG. 9. In S29 the CPU 21 generates print data based on the content file on the display field J7, and transmits the generated print data to the printer 7. If the editing process is performed in S24, the print data is based on the results of the editing process. In S81 the CPU 71 of the printer 7 receives the print data transmitted from the terminal device 2, and in S82 controls the driving circuits 82-84 based on the received print data to thereby execute the printing process. In S83 the CPU 71 transmits printing results to the terminal device 2 from which the print data is received in S81. The printing results include a print-process result indicating information as to whether printing is successful or failed, information as to whether the cassette (print medium) used for printing is the specific medium (the specific cassette) or not, and the length of the used print medium which is determined according to the print data.

In S30 the CPU 21 of the terminal device 2 receives the printing results, and in S31 determines whether the received printing results indicate that printing is successful. In a case where the received print results indicate that printing is successful (S31: YES), in S32 the CPU 21 determines based on the printing results whether the cassette (print medium) used for printing is the specific medium (the specific cassette). In Example 2, the print medium used for printing is determined not to be the specific medium (the specific cassette) (S32: NO). In this case, as shown in the screen E6 of FIG. 9, in S35 the CPU 21 displays the message J10 of "Print is completed" on the LCD 28 as the printing results received in S30. In Example 1, the print medium used for printing is determined to be the specific medium (the specific cassette) (S32: YES), in S33 the CPU 21 transmits print information to the medium management server 5. The print information includes the identification information of the cassette, and the length of the print medium used for printing. In S51 CPU 51 of the medium management server 5 receives the print information transmitted from the terminal device 2. In S52 the CPU 51 updates the remaining amount (length) of the tape, which is registered in the management information as shown in the table 59 of FIG. 3 and corresponds to the identification information included in the print information received in S51, by subtracting the length of the print medium included in the print information from the current remaining amount (length) registered in the management information. Subsequently, in S53 the CPU 51 transmits process completion information to the terminal device 2 from which the print information is received in S51. In S34 the CPU 21 of the terminal device 2 receives the process completion information. As shown in the screen E6 of FIG. 8, in S35 the CPU 21 displays the message J10 of "Print is completed" on the LCD 28 as the printing results received in S30. Ina case where the printing results indicating that the printing is failed (S31: NO), in S35 the CPU 21 displays, a message of "Print Failure" on the LCD 28, for example. The print information processing system 1 and the printer 7 end the processes.

In the print information processing system 1 including the terminal device 2 and the servers 5, 6 according to the embodiment, the terminal device 2, the camera 29, the communication interface 30, the CPU 21, and the storage 24 respectively examples a terminal device, a capturing device, a terminal communication interface, a terminal controller, and a terminal storage. The process of S2 is an example of acquiring an image and a capturing step. The content management server 6, the communication interface 65, the CPU 61, and the storage 64 respectively examples of a server, a server communication interface, a server controller, and a server storage. The medium management server 5, the communication interface 55, the CPU 51, and the storage 54 respectively examples of a server, a server communication interface, a server controller, and a server storage. The process of S42 is an example of detecting and detecting step. The process of S10 is an example of determining and determining step. The process of S63 is an example of an information transmission process and information transmission step. The process of S12 is an example of receiving information concerning specific content. The process of S24 is an example of an editing process and editing step. The process of S29 is an example of transmitting print data or communicating step. The processes of S10 and S11 are examples of a request transmission process. The process of S52 is an example of an updating process and updating step.

As described above, the print information processing system 1 includes the terminal device 2 and the servers 5 and 6. The terminal device 2 includes the camera 29, the communication interface 30 capable of communicating with the printer 7, the CPU 21 capable of controlling the camera 29 and the communication interface 30, and the storage 24 storing instructions for controlling the CPU 21. The CPU 21 acquires the image by controlling the camera 29 according to the instructions stored in the storage 24 (S2). The medium management server 5 includes the communication interface 55 capable of communicating with the terminal device 2, and the CPU 51 capable of controlling the communication interface 55, and the storage 54. The storage 54 stores instructions for controlling the CPU 51. The content management server 6 includes the communication interface 65 capable of communicating with the terminal device 2, and the CPU 61 capable of controlling the communication interface 65, and the storage 64. The storage 64 stores instructions for controlling the CPU 61, and information concerning content having at least one of the print data and the information available for editing the print data. The print information processing system 1 performs the detection process (S42) which analyzes the image acquired in S2 and detects the cassette (the case accommodating the print medium), and the determination process (S10) that determines whether the detected cassette satisfies the specific condition.

In a case where it is determined that the detected cassette satisfies the specific condition in the determination process of S10 (S10: YES), the content management server 6 transmits the information concerning the specific content stored in the storage 64 via the communication interface 65 to the terminal device 2 according to the instructions stored in the storage 64 (S63 and S69). On the other hand, in a case where it is determined that the detected cassette does not satisfy the specific condition (S10: NO), the content management server 6 does not transmit the information concerning the specific content stored in the storage 64 via the communication interface 65 to the terminal device 2. The CPU 21 of the terminal device 2 executes the process that receives the information concerning the specific content transmitted from the content management server 6 according to the instructions stored in the storage 24 (S12 and S18). Accordingly, the print information processing system 1 can detect the cassette 9 by analyzing the image captured in the terminal device 2 without mounting the cassette 9 accommodating the print medium to the printer 7. In this case, the print information processing system 1 can permit the use of information concerning the specific content available for editing the print data in a case where the cassette satisfies the specific condition.

The CPU 51 of the medium management server 5 analyzes the image captured by the camera 29 to detect the logo 113 including at least one of a symbol, emblem, logotype in the image and to detect the cassette 9 in the image based on the detected logo 113 (S43). The logo 113 is printed on the mark label 111 affixed to the cassette 9 that is to be mounted to the printer 7 for use. Here, the logo 113 is for identifying the type of the cassette or the print medium (the tape width W, color, material, and a model). Accordingly, the print information processing system 1 can detect the logo 113 in the image by analyzing the image captured by the terminal device 2, and detect the cassette 9 based on the detected logo 113.

The CPU 51 of the medium management server 5 analyzes the image captured by the camera 29 to detect the identification information of the cassette or the print medium in addition to the logo 113 and to detect the cassette 9 in the image based on the detected logo 113 and identification information. There are cases where the identification information identifying a cassette 9 (for example, the product number or the manufacturing number) is attached to the cassette 9 that is to be mounted to the printer 7 for use. Accordingly, the print information processing system 1 can detect the identification information as well as the logo 113 in the image by analyzing the image captured by the terminal device 2, and detect the cassette 9 based on the detected logo 113 and identification information. According to the print information processing system 1, the number of images required for detecting the cassette 9 can be reduced than a conceivable case where at least two images are analyzed for separately detecting the logo 113 and the identification information from these images.

The CPU 51 of the medium management server 5 detects the identification information based on detection results of the matrix type two-dimensional code 14 (QR code for example). Thus, the print information processing system 1 can detect the identification information based on detection results of the matrix type two-dimensional code 14 (QR code for example) by analyzing the image captured by the terminal device 2.

The storage 54 of the medium management server 5 stores the identification information of the cassette and the management information for managing the cassette so that the identification information and the management information are correlated with each other. The CPU 51 of the medium management server 5 stores the identification of the cassette or print medium detected in S42 in the storage 54 so as to be correlated with the management information of the cassette or the print medium according to the instructions stored in the storage 54 (S47). Accordingly, the print information processing system 1 can manage information on the cassette whose captured image is transmitted to the medium management server 5 based on the identification information of the cassette and management information stored in the storage 54.

The cassette 9 accommodates the tape-like print medium therein. The management information of the cassette includes the type of the print medium accommodated in the cassette, the longitudinal length of the print medium at the time when the print medium remains unused, and the tape width W that is a widthwise length of the print medium orthogonal to the longitudinal direction of the print medium. Accordingly, the print information processing system 1 can manage, as the management information, the type of the print medium accommodated in the cassette, the longitudinal length of the print medium at the time when the print medium remains unused, and the tape width W.

The CPU 51 stores, as the management information, the use history of the print medium accommodated in the cassette detected from the image in the storage 54 so that the use history is correlated with the identification information identifying the cassette according to the instructions stored in the storage 54 (S47). The specific condition includes the condition that the use history correlated with the identification information of the cassette satisfies the prescribed condition. Accordingly, the print information processing system 1 can manage the use history as the management information. In a case where the use history correlated with the identification of the detected cassette satisfies the specific condition, the print information processing system 1 can permit use of information concerning the specific content available for editing the print data.

The use history includes at least an initial access date that designates the date when the detection process for detecting the mounted cassette identified by the identification information is firstly executed. The prescribed condition includes the condition that the determination process in S10 is executed at a time within the predetermined number of days from the initial access date. The print information processing system 1 can store the initial access date. In a case where the determination process is executed within the predetermined number of days from the initial access date correlated with the identification information of the cassette, the print information processing system 1 can permit use of information concerning the specific content available for editing the print data. The print information processing system 1 can prompt the user to execute the determination process within the predetermined number of days from the initial access date.

The use history includes the number of accesses designating the number of times of execution of the cassette detection process. The prescribed condition includes the condition that the number of accesses is smaller than the predetermined number of times. The medium management server 5 in the print information processing system 1 can store, as the number of accesses, the number of times of transmission of the captured image representing the same cassette 9 from the terminal device 2 to the medium management server 5. The print information processing system 1 can permit to use the information concerning the specific content in a case where the number of accesses in the use history correlated with the identification information of the cassette 9 detected based on the captured image is within the predetermined number of times. The print information processing system 1 can increase the probability of the proper determination as to whether to permit use of the information concerning the specific content based on the detection results of the captured image of the cassette 9 used for printing. In other words, the print information processing system 1 can increase the probability of transmission of the information concerning the specific content suitable for the cassette or the print medium accommodated in the cassette detected from the captured image by the terminal device 2 compared to a conceivable case where the use of information concerning the specific content is permitted regardless of the number of accesses.

The use history includes the remaining amount of the tape indicating the remaining length of the print medium accommodated in the cassette. The prescribed condition includes a condition that the remaining amount (length) of the tape stored in the use history is larger (longer) than the predetermined amount (length). The print information processing system 1 executes the updating process of S52 to update the remaining amount of the tape included in the use history stored in the storage 54 according to the print data transmitted from the terminal device 2 to the printer 7. The print information processing system 1 can store the remaining amount (length) of the tape. The print information processing system 1 can permit to use the information concerning the specific content in a case where the remaining amount (length) of the tape, which is stored in the use history correlated with the identification information of the cassette detected based on the image, is larger (longer) than the predetermined amount (length). The print information processing system 1 restricts use of the information concerning the specific content in a case where the remaining amount (length) of the tape is smaller (shorter) than or equal to the predetermined amount (length). Accordingly, the print information processing system 1 can increase the probability to properly determine whether to use of the information concerning the specific content based on the detection results of the captured image of the cassette used for printing. In other words, the print information processing system 1 can increase the probability of transmission of the information concerning the specific content suitable for the cassette or the print medium accommodated in the cassette detected from the image captured by the terminal device 2 compared to a conceivable case where the use of information concerning the specific content is permitted regardless of the remaining amount (length) of the tape.

The print information processing system 1 executes the editing process for editing the print data based on the information concerning the content stored in the content management server 6 (S24). The print information processing system 1 can edit the print data based on the information concerning the specific content. The print information processing system 1 can improve usability for the user editing the print data compared to a conceivable case where the user edits print data from a clean state.

The CPU 21 of the terminal device 2 performs the editing process of S24 according to the instructions stored in the storage 24. The print information processing system 1 can edit the print data using the terminal device 2 based on the information concerning the specific content. That is, the terminal device 2 can execute the process for photographing the cassette (capturing an image of the cassette), the process for editing the print data based on the information concerning the specific content, and the process for transmitting the edited print data to the printer 7. Accordingly, the print information processing system 1 can improve usability for the user operating the editing process compared to a conceivable case where the editing process is performed by a device other than the terminal device 2. The print information processing system 1 can reduce loads of the servers 5 and 6 compared to a case where the servers 5 and 6 executes the editing process.

The information concerning the specific content includes at least one of the template, the font, and the external character. The editing process of S24 can edit the print data by using the information concerning the specific content. The print information processing system 1 can edit the print data based on the template, font, and external character included in the information concerning the specific content.

The CPU 51 of the medium management server 5 analyzes the image captured by the camera 29 to detect the shape of the cassette in the image, and detects the cassette in the image based on the detected shape (S42). The specific condition includes the condition that the shape of the cassette specified in the detection process has the prescribed shape. There are some cassettes used for the printer 7 to which no logo for identifying the type of the cassette or the print medium (the tape width W, color, material, model, and so on) accommodated in the cassette is attached. Even in such cases, the print information processing system 1 can detect the cassette based on the shape of the cassette in the image. The print information processing system 1 can reduce the probability that the cassette 1, which is not suitable for use in the printer 7 such as the old type cassette 10 of Example 2, is used in the printer 7.

According to the print information processing system 1, in a case where the information concerning the specific content is specific print data, the CPU 21 transmits the specific print data received from the content management server 6 or the edited specific print data to the printer 7 (S29). Thus, in a case where the cassette detected from the image satisfies the specific condition, the CPU 21 can transmit the specific print data to the printer 7. The printer 7 can perform printing based on the specific print data.

While the disclosure of the print information processing system, the print processing method, and the server has been described in detail with reference to the specific embodiment thereof, it would be apparent to those skilled in the art that various changes and modifications may be made therein without departing from the scope of the invention. For example, the following modifications may be made. Note the following modifications may be combined arbitrary.

(A) The configurations of the print information processing system 1 may be modified. For example, the medium management server 5 and the content management server 6 may be unified as one server. That is, one server performs functions or processes of the servers 5 and 6. The print information processing system 1 may include the printer 7 or not include the printer 7. The print information processing system 1 may include a plurality of terminal devices 2.

(B) Any program having instructions to execute processes of a corresponding device in the print information processing system 1 may be stored in the corresponding device 1 before the program is executed. A method to acquire the program, a path through which the program is acquired, and a device that pre-stores the program may be modified properly. Any program executed in the print information processing system 1 may be transmitted to one device executing the program from another device via cables or wireless communications, or may be pre-stored in a storage device such as a flash memory. Here, the another device may include a server connected to the one device executing the program via a PC or a network.

(C) Each step executed in the processes in the print information processing system 1 is executed in the corresponding CPU in the print information processing system 1 according to the embodiment. However, the configuration is not limited to this. For example, one or more steps may be executed by other electronic devices such as an ASIC. Each step in the print information processing system 1 may be executed according to distributed processing by a plurality of electronic devices (a plurality of CPUs, for example). The order of steps in the embodiment may be changed accordingly. Addition of a new step or omission of any step may be permitted accordingly. The present disclosure encompasses the configuration where an operating system (OS) running on the print information processing system 1 executes all or part of the processes according to the instructions from a controller (a CPU) included in the print information processing system 1. For example, the following modifications may be made in the processes in the print information processing system 1.

The terminal device 2 may execute the detection process, which is executed in the medium management server 5 in the embodiment, to detect the cassette (or the case accommodating the print medium) and whose image is captured by the camera 29. In this case, the terminal device 2 transmits the specific content information acquisition request based on the detection results.

The medium management server 5 may transmit at least one of the specific content information acquisition request and the normal content information acquisition request to the content management server 6 based on the medium information set in S43.

The servers 5 and 6 may execute the process to determine whether the cassette detected in S42 satisfies the specific condition.

The print information processing system 1 may not transmit the information concerning the normal content in a case where the cassette detected based on the image captured by the terminal device 2 does not satisfy the specific condition.

The print information processing system 1 may not store all or part of the management information, and may omit all or part of the process to determine whether the detected cassette satisfies the specific condition based on the management information. The management information may not include the use history. In a case where the management information does not include the use history, the print information processing system 1 may appropriately omit the process to update the use history.

The shape, size, or type of the cassette mounted to the printer 7 may be appropriately modified. The type, and arrangement of the mark labels 111 and 112 may be modified. The number of each of the mark labels 111 and 112 may be larger than one. Further, drawing pattern, texts, and their arrangement printed on the mark labels 111 and 112 may be modified appropriately. The terminal device 2 may capture two or more images to detect the cassette. The image captured by the terminal device 2 may be any image that enables the detection of the cassette, and thus may be any captured image representing the entire cassette viewed from an arbitrary angle, or any captured image representing a characteristic part of the cassette. Here, the characteristic part of the cassette may be at least one mark label, for example. In this case, the print information processing system 1 may detect the cassette by detecting the mark label(s) in the image captured by the terminal device 2. The specific condition may be modified according to the type of the cassette. The specific condition may include only one condition. The specific condition may be satisfied when predetermined number of conditions are satisfied from among a plurality of conditions. In a case where the content management server 6 stores the information concerning the content, the content management server 6 may directly transmit print data designated by the terminal device 2 according to the instruction from the terminal device 2 so as to allow the printer 7 to perform printing based on the transmitted print data.

What is claimed is:

1. A print information processing system comprising:
   a terminal device; and
   a server,
   wherein the terminal device includes:
      an image capturing device;
      a terminal communication interface communicable with both the server and a printer;
      a terminal controller configured to control both the image capturing device and the terminal communication interface; and
      a terminal storage storing terminal instructions that, when executed by the terminal controller, cause the terminal controller to perform controlling the image capturing device to capture an image representing at least part of a cassette and acquiring the captured image, the cassette accommodating print medium therein,
   wherein the server includes:
      a server communication interface communicable with the terminal device;
      a server controller configured to control the server communication interface; and
      a server storage storing information concerning a specific content including at least one of print data and information available for editing the print data, the server storage further storing server instructions for controlling the server controller,
   wherein the print information processing system is configured to perform:
      a detection process for detecting the cassette by analyzing the image captured by the image capturing device; and
      a determination process for determining whether the detected cassette satisfies a specific condition,
   wherein the server instructions, when executed by the server controller, cause the server controller to perform an information transmission process for transmitting the information concerning the specific content stored in the server storage to the terminal device through the server communication interface in a first case where the determination process determines that the detected cassette satisfies the specific condition,
   wherein the information transmission process is not performed in a second case where the determination process determines that the detected cassette does not satisfy the specific condition,
   wherein the terminal instructions, when executed by the terminal controller, cause the terminal controller to further perform receiving the information concerning the specific content transmitted from the server controller.

2. The print information processing system according to claim 1, wherein the detection process detects a logo including at least one of a symbol, an emblem, and a logotype by analyzing the image captured by the image capturing device, and detects the cassette from the captured image based on the detected logo.

3. The print information processing system according to claim 2, wherein the detection process detects identification information for identifying the cassette in addition to detecting the logo by analyzing the image captured by the image capturing device, and detects the cassette from the captured image based on both the identification information and the detected logo.

4. The print information processing system according to claim 3, wherein the detection process detects a matrix type two-dimensional code, and detects the identification information based on the detected matrix type two-dimensional code.

5. The print information processing system according to claim 3, wherein the server instructions, when executed by the server controller, cause the server controller to further perform storing the identification information for identifying the cassette detected in the detection process and management information for managing the cassette so that the identification information and the management information are correlated with each other.

6. The print information processing system according to claim 5, wherein the print medium is a tape-like print medium elongated in a longitudinal direction,
   wherein the management information of the cassette includes a type of the print medium accommodated in the cassette, a length of the print medium in the longitudinal direction at a time when the print medium is unused, and a width of the print medium in a direction orthogonal to the longitudinal direction.

7. The print information processing system according to claim 5, wherein the server instructions, when executed by the server controller, cause the server controller to further perform storing in the server storage a use history of the print medium as the management information so that the use history is correlated with the identification information for identifying the cassette,
   wherein the specific condition includes a condition that the use history correlated with the identification information for identifying the detected cassette satisfies a prescribed condition.

8. The print information processing system according to claim 7, wherein the use history includes an initial access date designating a date at which the detection process is firstly executed for the cassette identified by the identification information,
   wherein the prescribed condition includes a condition that the determination process is executed within a time range from the initial access date.

9. The print information processing system according to claim 7, wherein the use history includes number of accesses indicating number of times of execution of the detection process for the cassette identified by the identification information,
   wherein the prescribed condition includes a condition that the number of accesses is smaller than a prescribed number.

10. The print information processing system according to claim 7, wherein the print medium is a tape-like print medium elongated in a longitudinal direction,
    wherein the use history includes a remaining amount of the print medium accommodated in the cassette,
    wherein the prescribed condition includes a condition that the remaining amount in the use history is larger than a prescribed amount,
    wherein the print information processing system is configured to further perform an updating process for updating the remaining amount of the print medium in the use history stored in the server storage according to print data transmitted to the printer from the terminal device.

11. The print information processing system according to claim 1, wherein the print information processing system is configured to further perform an editing process for editing the print data based on the information concerning the specific content stored in the server storage.

12. The print information processing system according to claim 11, wherein the terminal instructions, when executed by the terminal controller, cause the terminal controller to further perform:
the editing process; and
transmitting the edited print data to the printer via the terminal communication interface.

13. The print information processing system according to claim 11, wherein the information concerning the specific content includes at least one of a template, a font, and an external character, the template being for defining an image,
wherein the editing process edits the print data using the information concerning the specific content stored in the server storage.

14. The print information processing system according to claim 1, wherein the terminal instructions, when executed by the terminal controller, cause the terminal controller to further perform:
the determination process; and
transmitting to the server a transmission request for transmission of the information concerning the specific content stored in the server storage in the first case where the determination process determines that the detected cassette satisfies the specific condition,
wherein the transmitting is not executed in the second case where the determination process determines that the detected cassette does not satisfy the specific condition,
wherein the information transmission process transmits the information concerning the specific content to the terminal device in a case where the server receives the transmission request from the terminal device,
wherein the information transmission process does not transmit the information concerning the specific content to the terminal device in a case where the server does not receive the transmission request from the terminal device.

15. The print information processing system according to claim 1, wherein the detection process detects a shape of the cassette by analyzing the image captured by the image capturing device, and detects the cassette from the captured image based on the detected shape,
wherein the specific condition includes a condition that the detected shape matches a prescribed shape.

16. A method for processing print information comprising:
controlling an image capturing device to capture an image representing at least part of a cassette, the cassette accommodating print medium therein;
detecting the cassette by analyzing the image captured by the image capturing device;
determining whether the detected cassette satisfies a specific condition; and
permitting use of a piece of specific information from among a plurality of pieces of information stored in a storage in a first case where the detected cassette satisfies the specific condition in the determining, the plurality of pieces of information concerning respective ones of contents, the piece of specific information concerning a specific content,
wherein the permitting is not executed in a second case where the detected cassette does not satisfy the specific condition.

17. The method according to claim 16, wherein the piece of specific information includes at least one of a template, a font, and an external character, a template being for defining an image,
the method further comprising:
editing print data by using the piece of specific information; and
transmitting the print data edited in the editing to a printer.

18. The method according to claim 17, wherein the piece of specific information includes specific print data,
wherein the transmitting transmits the specific print data to the printer.

19. The method according to claim 17, wherein the detecting detects a logo including at least one of a symbol, an emblem, and a logotype, from the image captured by the image capturing device, and detects the cassette from the captured image based on the detected logo.

20. The method according to claim 19, wherein the detecting detects identification information for identifying the cassette in addition to the logo from the image captured by the image capturing device, and detects the cassette from the captured image based on both the identification information and the detected logo.

21. The method according to claim 20, wherein the print medium is a tape-like print medium elongated in a longitudinal direction,
where a storage stores identification information identifying the cassette and a remaining amount of the print medium stored in the cassette so that the identification information and the remaining amount are correlated with each other,
wherein the specific condition includes a condition that the remaining amount is larger than a prescribed amount,
the method further comprising updating the remaining amount of the print medium stored in the storage according to the print data, which is edited in the editing and transmitted to the printer.

22. A server comprising:
a server communication interface communicable with a terminal device;
a server controller configured to control the server communication interface; and
a server storage configured to store information concerning a specific content including at least one of print data and information available for editing the print data, the server storage storing server instructions that, when executed by the server controller, cause the server controller to perform:
receiving an image from the terminal device;
a detection process for detecting a cassette accommodating print medium therein by analyzing the received image; and
transmitting the information concerning the specific content stored in the server storage to the terminal device through the server communication interface in a first case where the detected cassette satisfies a specific condition, wherein the transmitting is not performed in a second case where the detected cassette does not satisfy the specific condition.

* * * * *